United States Patent [19]
Hardeman et al.

[11] Patent Number: 5,376,460
[45] Date of Patent: Dec. 27, 1994

[54] POLYESTERS SUITABLE FOR USE IN OUTDOOR-DURABLE COATING SYSTEMS

[75] Inventors: Gerard Hardeman, Arnhem; Wilhelmina Westerhof; Johannes W. Besamusca, both of Zwolle, all of Netherlands

[73] Assignee: DSM N.V., Heerlen, Netherlands

[21] Appl. No.: 216,516

[22] Filed: Mar. 23, 1994

Related U.S. Application Data

[63] Continuation of Ser. No. 916,789, Jul. 22, 1992, abandoned.

[30] Foreign Application Priority Data

Jul. 22, 1991 [NL] Netherlands ............... 9101275

[51] Int. Cl.$^5$ ............................... B32B 27/36
[52] U.S. Cl. ................... 428/482; 528/272; 528/295.5; 528/296; 528/302; 528/307; 528/308; 528/308.6; 525/437; 525/444; 525/444.5; 525/450; 428/480
[58] Field of Search ......... 528/272, 295.5, 296, 528/302, 307, 308, 308.6; 525/437, 444, 444.5, 450; 428/480, 482

[56] References Cited

U.S. PATENT DOCUMENTS

| | | | |
|---|---|---|---|
| 4,352,924 | 10/1982 | Wooten et al. | 528/302 |
| 4,649,175 | 3/1987 | Inoue et al. | 525/38 |
| 5,053,463 | 10/1991 | Inoue | 525/427 |

FOREIGN PATENT DOCUMENTS

| | | |
|---|---|---|
| 145006 | 6/1985 | European Pat. Off. |
| 90103274 | 2/1990 | Japan . |
| 2140440 | 11/1984 | United Kingdom . |

*Primary Examiner*—Samuel A. Acquah
*Attorney, Agent, or Firm*—Cushman Darby & Cushman

[57] ABSTRACT

The invention relates to polyesters for use in outdoor-durable coating systems such as, for instance, coil coating systems. The polyester according to the invention is based on at least 50 moles % 1,4-cyclohexanedicarboxylic acid and a hexahydrophathalic acid (anhydride) as acid components. Up to a maximum of 50 moles % the polyester may be based also on acid components such as, for instance, isophthalic acid, terephthalic acid, adipic acid, sebacic acid, decanedicarboxylic acid and/or dimerized fatty acids or acid anhydrides such as, for instance, phthalic anhydride and succinic anhydride.

6 Claims, No Drawings

POLYESTERS SUITABLE FOR USE IN OUTDOOR-DURABLE COATING SYSTEMS

This is a continuation of application Ser. No. 07/916,789, filed on Jul. 22, 1992, which is abandoned.

The invention relates to polyesters for use in outdoor-durable coating systems such as, for instance, coil coating systems.

The use of polyesters in coil coating systems is disclosed in 'Developments in Coil Coatings' in Polymers Paint Colour Journal (Dec. 13, 1989; Volume 179, No. 4251) by Gary Williams.

A disadvantage of the nowadays for outdoor-durable coil-coatings used silicone-modified polyesters (disclosed in said article) is their bad flexibility.

It is an object of the present invention to provide polyesters which result in coatings combining a good outdoor durability and good mechanical properties. Said combination makes them more suitable for outdoor-durable applications.

The polyester according to the invention is based on at least 50 moles % 1,4-cyclohexane dicarboxylic acid and a hexahydrophthalic acid (anhydride) as acid components and the polyester has a molecular weight $M_n$ between 2600 and 10000.

More preferably the molecular weight is above 3000.

These polyesters result in coil coating systems combining an excellent outdoor durability with good mechanical properties.

According to a preferred embodiment of the invention the polyester is based on 55–100 moles % 1,4-cyclohexane dicarboxylic acid and a hexahydrophthalic acid (anhydride) as acid components.

The polyester can be a hydroxyl-functional polyester or a carboxyl-functional polyester. Preferably the polyester is a hydroxyl-functional polyester.

The polyester is a substantially oil-free polyester.

The polyesters according to the invention can be obtained by reacting an acid or an acid anhydride with a polyalcohol.

The molar ratio of polyalcohol to acid or acid anhydride is usually between 1.2:1.0 and 1.0:1.0 in case of an hydroxyl-functional polyester.

In addition to 1,4-cyclohexane dicarboxylic acid and a hexahydrophthalic acid (anhydride), the polyester can be based on a maximum of 50 moles % other acid components such as, for instance, isophthalic acid, terephthalic acid, adipic acid, sebacic acid, decanedicarboxylic acid and/or dimerized fatty acids or acid anhydrides such as, for instance, phthalic acid anhydride and succinic acid anhydride.

Suitable hexahydrophthalic acids or anhydrides include methylhexahydrophthalic acid, hexahydroisophthalic acid and/or hexahydrophthalic acid or anhydride.

According to a preferred embodiment of the invention the amount of aromatic acid units is lower than 10 mol %.

More preferably, the amount of aromatic acid units is substantially 0 mol %.

Substantially aromatic acid free compositions result in coatings with an excellent gloss.

Suitable polyalcohols for the preparation of the hydroxyl-functional polyester include butanediol-(1,4), hexanediol-(1,6), neopentylglycol, trimethylpentanediol, hydroxypivalineneopentylglycol ester, tricyclodecanedimethanol, cyclohexanedimethanol and trimethylopropane.

Preferably neopentylglycol and/or hydroxypivalineneopentylglycol ester are used.

Preferably the hydroxyl groups of the diol or polyol are attached to different carbon atoms which are not directly connected to each other. They are separated by at least one carbon atom.

The ratio of cyclohexanedicarboxylic acid (CHDA) to hexahydrophthalic acid (anhydride) (HHPAA) and optionally other acid components can be chosen in dependence of the desired use. The molar ratio of 1,4-cyclohexanedicarboxylic acid : hexahydrophthalic acid (anhydride) may range between, for instance, 5:1 and 1:5.

A suitable polyester is, for example, based on CHDA and HHPAA as acid components in a molar ratio 1:1.

Another suitable polyester is based on, for example, 55 mol % CHDA and HHPAA in a molar ratio 80:20 and 45 mol % isophthalic acid.

It is possible to use mixtures of polyesters according to the invention to optimalize and to obtain certain characteristics of the coating.

The esterification reaction preferably takes place in a nitrogen atmosphere at temperatures of between 180° C. and 260° C. As additives, catalysts such as, for instance, dibutyltin oxide, tin chloride or tetrabutoxytitanate and antioxidants such as, for instance, triphenylphosphite may be added. During the reaction, the reaction water released is removed by distillation and the desired degree of esterification is achieved by applying azeotropic distillation or vacuum in the final phase. The reaction results in a polyester which can subsequently be dissolved in an organic solvent or a mixture of solvents. Suitable solvents include aromatic hydrocarbons and glycol ether esters such as for example methylpropylene-glycolacetate or ethylpropyleneglycolacetate or glycol ethers such as butyl glycol.

The polyesters according to the invention do hardly absorb any UV-light and are because of this reason UV-resistant.

The coating composition can be obtained by first preparing a pigment paste in which the polyester resin according to the invention and pigment, for instance titanium dioxide, are mixed for example in a weight ratio of between 80:120 and 120:80, preferably in a weight ratio of substantially virtually 1:1. Subsequently, after cooling to room temperature, crosslinkers such as for example an amino resin, for instance hexamethoxymelamine, or an isocyanate-functional hardener, for instance the biuret of 1,6 hexanediisocyanate (Desmodur N ™), can be added. Also a catalyst, for instance paratoluenesulphonic acid or dibutyltin dilaurate, can be added in amounts of preferably less than 2% (wt) (calculated on the coating composition). Optionally, other additives such as for example flow modifiers and wetting agents may be used also.

The weight ratio polyester resin: crosslinker is usually between 60:40 and 95:5.

The composition can be diluted with solvents. Suitable solvents include aromatic hydrocarbon fractions, for instance Solvesso 150 ™ (of Esso), methylpropyleneglycolacetate (MPA) or butyl glycol. In this way a coating composition with a solids content of between, for instance, 60% and 80% can be obtained.

The coating composition can be applied with a wire coater on special chromated alucoil with a dry coat thickness of 15–30 μm. The baking cycle is 45–50 seconds at 295° C., which corresponds with a peak metal temperature (PMT) of 232° C.–241° C.

Preferably the coating composition according to the invention is used in the so-called outdoor-durable coil coatings. Other applications include, for instance, the use as an automotive top coating for plastic substrates.

The polyesters according to the invention can also be applied for water-borne coatings.

The invention will be further elucidated by the following examples without, however, being limited thereto.

EXAMPLES

Example I

Preparation of a polyester resin 2.1 moles hydroxypivalineneopentylglycol ester (Esterdiol 204 TM), 8.5 moles neopentylglycol (NPG), 4.7 moles 1,4-cyclohexanedicarboxylic acid (CHDA), 5,3 moles hexahydrophthalic anhydride (HHPA) and 0.05 part by weight dibutyltin oxide were heated in a glass reaction flask with a mechanical stirrer, a thermometer and a distillation arrangement with vigreux, in a nitrogen atmosphere. The esterification reaction started at 180° C. and the reaction water formed was removed by distillation. The maximum reaction temperature was 240° C. After the reaction mixture was clear, azeotropic distillation was started using an aromatic hydrocarbon fraction (Solvesso 150 TM) until an acid number lower than 7 was reached.

The final acid number of the solid resin was between 4 and 7. The viscosity measured as a 60% solution in Solvesso 150 TM /butyl glycol (4:1) in an Emila with spindle 100 at 23° C. was 9.5–10.5 dPa.s.

The molecular weight $M_n$ was 4500 and the hydroxyl functionality 2.0.

Mn is determined by GPC (gel permeation chromatography; polystyrene standard).

Example II

Preparation of a polyester resin

Example I was repeated using, instead of 8.5 moles NPG and 2.1 moles Esterdiol 204 TM, 6.8 moles NPG, 2.0 moles Esterdiol 204 TM and 1.8 hexanediol-1,6. Further, instead of 4.7 moles CHDA and 5.3 moles HHPA, 4.35 moles CHDA, 1.15 moles HHPA and 4.50 moles IPA (isophthalic acid) were used.

The final acid number of the solid resin was between 4 and 7. The viscosity measured in an Emila with spindle 100 at 23° C. was between 27 and 30 dPa.s.

The molecular weight ($M_n$) was 4500 and the hydroxyl-functionality 2.0.

Example III

Preparation of coating composition

To 45.8 parts by weight of a hydroxyl-functional polyester resin obtained according to Example I (dissolved in Solvesso 150 TM and butyl glycol (4:1), 27.50 parts by weight solid), 50.0 parts by weight titanium dioxide (Kronos 2310 TM) was added. This mixture was subsequently ground to form pigment paste.

After cooling to room temperature, 15.0 parts by weight polyester resin according to Example I (dissolved in Solvesso 150 TM and butyl glycol (4:1), 15.0 parts by weight solid) was then mixed with 7.5 parts by weight hexamethoxy melamine (7.5 parts by weight solid) and 0.75 part by weight paratoluene sulphonic acid (Nacure 2500 TM of King Industries). The final viscosity of the resin composition was between 80–130 sec. (DIN cup 4).

The resulting composition was applied with a wire coater on special chromated alucoil in a coating thickness of 100 μm. The dry coat thickness was 19–23 μm after a baking cycle of 45–50 seconds at 295° C., which corresponds with a PMT of 232° C.–241° C.

The properties of the resulting coating after curing are shown in Table I.

Example IV

Preparation of coating composition

Example III was repeated, the polyester used being the polyester obtained according to Example II. The properties of the resulting coating after curing are shown in Table I.

TABLE I

| coating composition according to example | III | IV |
|---|---|---|
| Flexibility[1] | 0 T | 0.5 T |
| Hardness[2] | HB | HB |
| Impact resistances[3] | 80 | 80 |
| QUV[4] (loss of 50% gloss) measured at an angle of 20° | >3000 hours | 1250 hours |

[1] The flexibility was measured via the T-bend test (ASTM-D-4145)
[2] The hardness was determined via pencil hardness
[3] The impact strength was determined via ASTM-D-2794-69 (reversed impact)
[4] QUV was determined via ASTM-G-53.

It is evident that the polyester according to the invention results in coil coatings with good mechanical properties and a very good outdoor durability. The flexibility has to be 0.5 T as a maximum and is preferably OT. The QUV has to be more than 1000 hours.

COMPARATIVE EXAMPLE A

Example III was repeated, the polyester used being a silicon-modified polyester (Uralac SQ 870-SlF2/57 TM; DSM Resins). The properties of the resulting coating after curing are shown in Table II.

TABLE II

| coating composition according to comparative example A | |
|---|---|
| Flexibility | 3T |
| Hardness | H |
| Impact resistance | 80 |
| QUV (loss of 50% gloss) measured at an angle of 20° | 1000 hours |

We claim:
1. A coil coating composition comprising:
a polyester having a molecular weight $M_n$ between 2,600 and 10,000, said polyester being substantially oil-free and resulting from the process comprising the steps of:
reacting an acid component selected from the group consisting of an acid and acid anhydride, with a polyalcohol, wherein at least 50 moles % of said acid component comprises 1,4-cyclohexanedicarboxylic acid and a hexahydrophthalic acid (anhydride), wherein said polyalcohol is selected from the group consisting of butanediol-(1,4), hexanediol-(1,6), neopentylglycol, trimethylpentanediol, hedroxypivalineneopentylglycolester, tricyclodecanedimethanol, cyclohexanedimethanol and trimethylolpropane, and wherein the hydroxyl groups of the diol or polyol are attached to different carbon atoms which are separated by at least one carbon atom;
a crosslinker; and
optionally a catalyst.

2. A coil coating composition according to claim 1, wherein the amount of aromatic acid units is substantially 0 mol. %.

3. A method making a coil coating composition comprising a polyester having a molecular weight $M_n$ between 2,600 and 10,000, said polyester being substantially oil-free, the method comprising the steps of:
reacting an acid component selected from the group consisting of an acid and acid anhydride, with a polyalcohol, wherein at least 50 moles % of said acid component comprises 1,4-cyclohexanedicarboxylic acid and a hexahydrophthalic acid (anhydride), wherein said polyalcohol is selected from the group consisting of butanediol-(1,4), hexanediol-(1,6), neopentylglycol, trimethylpentanediol, hedroxypivalineneopentylglycolester, tricyclodecanedimethanol, cyclohexanedimethanol and trimethylolpropane, and wherein the hydroxyl groups of the diol or polyol are attached to different carbon atoms which are separated by at least one carbon atom.

4. A cured coil coating composition having improved resistance to UV light and improved flexibility made by curing the coating composition of claim 1.

5. A cured coil coating composition having improved resistance to UV light, improved flexibility, and improved gloss retention made by curing the coating composition of claim 2.

6. A method according to claim 3, further comprising the steps of forming a pigment paste by combining said polyester with a pigment, and after cooling to room temperature adding a crosslinker and optionally a catalyst.

* * * * *